June 1, 1937. A. F. VON DER LINDEN 2,082,432
MUSIC INSTRUCTION DEVICE
Filed Dec. 31, 1935
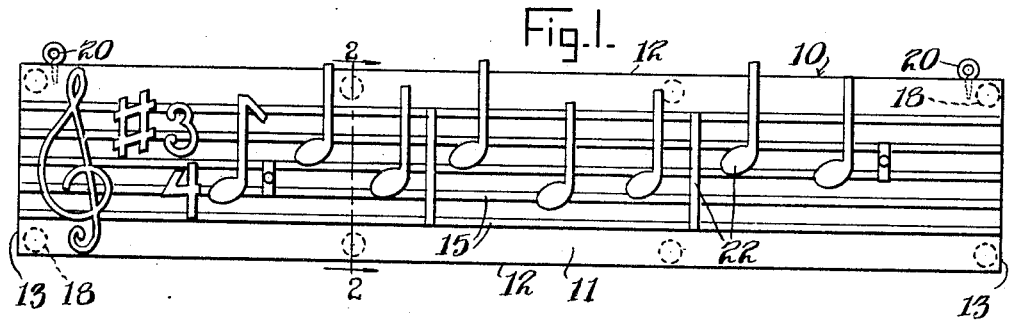
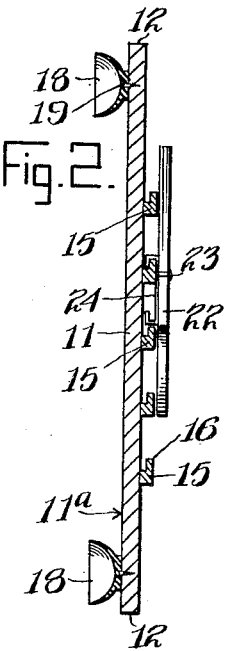
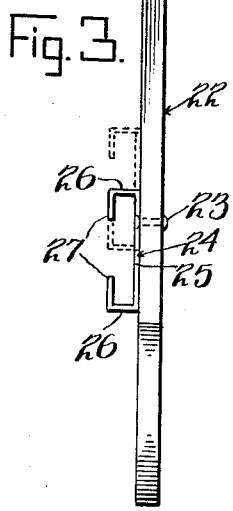
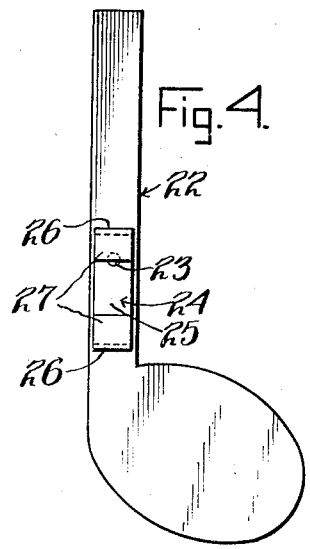
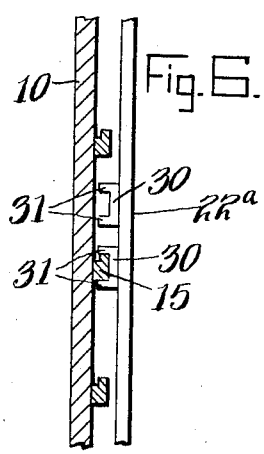
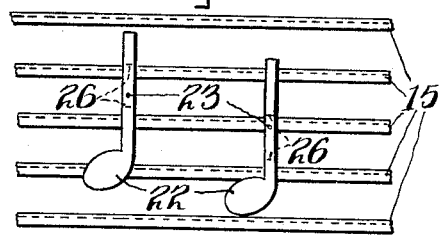
Arthur F. von der Linden
INVENTOR
BY Carl Miller
ATTORNEY Patented June 1, 1937

2,082,432

UNITED STATES PATENT OFFICE 2,082,432

MUSIC INSTRUCTION DEVICE

Arthur F. von der Linden, Bloomfield, N. J.

Application December 31, 1935, Serial No. 56,892

2 Claims. (Cl. 84—471)

This invention relates to music instructing devices. It is particularly directed to a backboard having five parallel rails or tracks representing a staff on which are mounted enlarged representations of various musical symbols adapted to be arranged in different combinations to simulate written music.

An object of this invention is to provide a device of the character described having representations of musical symbols provided with means for mounting the same on various parts of the staff, either on the lines thereof, or between said lines.

A further object of this invention is to provide a device of the character described, having a backboard provided with rubber suction cups and eye hooks for conveniently mounting the same either on a blackboard or wall, and facilitating shifting of the device from room to room.

A still further object of this invention is to provide a neat, compact and rugged device of the character described which shall be relatively inexpensive to manufacture, simple to manipulate and withal, practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a front elevational view of a music instruction device embodying the invention;

Fig. 2 is a cross-sectional view taken on line 2—2 of Fig. 1;

Fig. 3 is a side edge view of a member representing a note of music;

Fig. 4 is a rear elevational view of the device shown in Fig. 3;

Fig. 5 is a partial front elevational view of the structure shown in Fig. 1 and illustrating the position of representations of a note in different positions on the staff.

Fig. 6 is a cross-sectional view of a device embodying the invention and illustrating a modified construction.

Referring now in detail to the drawing, 10 designates a musical instruction chart or device embodying the invention. The device 10 comprises an elongated flat oblong board 11 having longitudinal top and bottom edges 12 and end edges 13.

Fixed to or integrally formed with the back board 11 are a plurality of longitudinal parallel rails or tracks 15 spaced apart by equal distances. There are preferably five rails 15 representing the five lines of a staff. The rails 15 are preferably centrally located with respect to the top and bottom edges 12 of the member 11, and are each formed with an upstanding flange 16 spaced from and parallel to the backboard 11. The rails or tracks preferably extend clear through from one end to the other of the backboard.

Fixed to the four corners of the rear surface 11a of the backboard 11 and to intermediate portions of the backboard adjacent the top and bottom edges thereof, are suction cups 18 of rubber, preferably screwed to the backboard by means of the screws 19. With such construction, the backboard may be mounted on any flat wall, for example, a blackboard in a schoolroom. There may be further screwed to the top edge 12 of the backboard 11, a pair of eyelets 20 so that the backboard may be hung from a pair of hooks.

Mounted on the tracks or rails 15 are representations of various musical symbols, for example, clefs, notes, flats, bars, sharps or the like symbols. Each one has a conventional contour or shape and is made of flat wood, metal, composition or other suitable material. One of said representations is shown in Figs. 2, 3 and 4, and comprises a member 22, simulating a note of music.

For mounting the member 22 on the backboard, there is pivotly attached to the rear surface, as by rivet 23, a hanger or bracket 24. The bracket 24 has a portion 25 contacting the rear surface of the member 22. Extending rearwardly from the upper and lower ends of the portion 25 are portions 26 from which there extends inwardly aligned portions 27 terminating short of one another. The bracket is thus provided with hooks at the ends thereof. As shown in the drawing, the rivet 23, which pivotly attaches the bracket 24 to the member 22, is longitudinally off center with respect to the portion 25 of the hanger. Thus, one hook portion of the hanger is closer to the rivet than the other hook portion. The member 22 is mounted on a backboard by engaging the upper hook portion of the hanger with the flange 16 of one of the tracks or rails 15. Preferably, the length of the hanger from top to bottom is equal to the distance between centers of a pair of adjacent tracks 15, and the pivotal point is one-quarter of the distance from one end of the hanger 25 to the other. When the hanger is thus rotated through an angle of 180 degrees, the position of the hanger is shifted on the member 22 by a distance equal to half the distance between centers of a pair of adjacent tracks.

The rivet 23, furthermore, is so located on the member 22 that when said member is hung on one of the tracks 15, the note will be located either on one of the lines of the staff or between the lines of the staff, depending upon whether the bracket 24 is in the full or dotted line position shown in Fig. 3 of the drawing. The note may thus be moved half the distance between a pair of adjacent tracks or lines of the staff by rotating the bracket 24 from the full line position of Fig. 3 to the dotted line position and hanging the note on the same track. To shift the member 22 the full distance between a pair of adjacent lines of the staff, the member is removed from one track and hung on the next adjacent track. The members 22, furthermore, may be readily slidably moved along the tracks as will be apparent from the drawing.

It will now be understood that the device 10 is a visible means of demonstrating to a class in music, the meaning of different positions of the notes on the staff. By using the simple catch or hanger, the pupil may very easily shift the notes from one position to another. The backboard, furthermore, may be very easily moved from one room to another so that it can be used in more than one room. Its method of attachment to any part of the room facilitates the shifting thereof from one room to another.

In Fig. 6, there is shown a modified construction wherein member 22a, which is a representation of a note or other musical symbol, has fixed to the rear surface thereof, in any suitable manner, a pair of spaced channel-shaped brackets 30. Members 30 may be made of rubber or other suitable material and are spaced apart, between centers, a distance equal to half the distance between centers of adjacent tracks. The member 22a may be mounted on one of the tracks by engaging the fingers 31 of one of the brackets 30 with one of the tracks 15. Said member 22a may be shifted half the distance between an adjacent pair of tracks by pulling the same off the track and again mounting the same on said track by engaging the other bracket 30 therewith.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In combination, a backboard and a plurality of parallel tracks attached thereto, a member representing a musical symbol, and a plurality of channel-shaped brackets fixed to said member, and each adapted to grip one of said tracks, the distance between the centers of said brackets being equal to half the distance between centers of a pair of adjacent tracks.

2. In combination, a backboard and a plurality of parallel tracks attached thereto, a member representing a musical symbol, and a plurality of channel-shaped brackets fixed to said member, and each adapted to grip one of said tracks, the distance between the centers of said brackets being equal to half the distance between centers of a pair of adjacent tracks, said brackets being made of rubber.

ARTHUR F. von der LINDEN.